United States Patent
Huang et al.

(10) Patent No.: US 10,684,705 B1
(45) Date of Patent: Jun. 16, 2020

(54) TOUCHPAD MODULE

(71) Applicant: PRIMAX ELECTRONICS LTD., Taipei (TW)

(72) Inventors: Tai-Sou Huang, Taipei (TW); Chun-Ming Hsu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/448,512

(22) Filed: Jun. 21, 2019

(30) Foreign Application Priority Data

Mar. 22, 2019 (TW) .............................. 108110143 A

(51) Int. Cl.
*G06F 3/0354* (2013.01)
*G06F 3/041* (2006.01)

(52) U.S. Cl.
CPC ........ *G06F 3/03547* (2013.01); *G06F 3/0414* (2013.01)

(58) Field of Classification Search
CPC .......................... G06F 3/03547; G06F 3/0414
See application file for complete search history.

(56) References Cited

U.S. PATENT DOCUMENTS

| | | | |
|---|---|---|---|
| 2016/0266617 A1* | 9/2016 | Shen | G06F 1/1692 |
| 2017/0271101 A1* | 9/2017 | Huang | G06F 1/169 |
| 2019/0317602 A1* | 10/2019 | Chen | G06F 1/1662 |
| 2019/0384426 A1* | 12/2019 | Huang | G06F 1/16 |
| 2020/0050241 A1* | 2/2020 | Uang | G06F 1/169 |

* cited by examiner

*Primary Examiner* — Hong Zhou
(74) *Attorney, Agent, or Firm* — WPAT, PC

(57) ABSTRACT

A touchpad module for an electronic device includes an alloy supporting structure, an elastic metal sheet, a metal plate, a metallic position-limiting part and a circuit board. The elastic metal sheet and the metal plate are connected with two opposite surfaces of a bent part of the alloy supporting structure, respectively. The metallic position-limiting part is penetrated through the bent part. The elastic metal sheet and the metal plate are connected with each other through the metallic position-limiting part. The circuit board is located over the elastic metal sheet. The positioning part of the metal plate is penetrated through the positioning hole of the bent part, and connected with a casing of the electronic device.

17 Claims, 5 Drawing Sheets

TOUCHPAD MODULE

FIELD OF THE INVENTION

The present invention relates to the field of a touchpad module, and more particularly to a touchpad module for an electronic device.

BACKGROUND OF THE INVENTION

A touchpad is an input module that allows the user's finger to press or slide on a smooth panel to control the operation of the electronic device. Since the touchpad is very thin, the touchpad is usually applied to a notebook computer, a smart phone, a personal digital assistant (PDA) or any other appropriate electronic device.

As the trend of designing the modern electronic device is toward slimness and light weightiness, the light alloy material has been widely applied to a supporting structure of the touchpad module.

However, if the supporting structure is excessively thin, the mechanical strength of the supporting structure made of the light alloy material is impaired. Moreover, since the durability is reduced, the touchpad module is readily damaged. Moreover, if the surface of the alloy material (e.g., aluminum alloy) is oxidized or subjected to an oxidization treatment, the conductivity of the supporting structure is gradually decreased or even lost. Under this circumstance, the original grounding function of the supporting structure is lost. Since the grounding function is lost, electrostatic charges are gradually accumulated in the touchpad module. In case that an electrostatic discharge (ESD) effect occurs, the circuits or electronic components on the circuit board of the touchpad module are possibly destroyed. Under this circumstance, the touchpad module cannot be normally operated.

For overcoming the drawbacks of the conventional technologies, there is a need of providing a touchpad module with light weightiness and high mechanical structure and having an electrostatic discharge protection function.

SUMMARY OF THE INVENTION

The present invention provides a touchpad module with light weightiness and high mechanical structure and having an electrostatic discharge protection function.

In accordance with an aspect of the present invention, there is provided a touchpad module for an electronic device. The touchpad module includes an alloy supporting structure, an elastic metal sheet, a metal plate, at least one metallic position-limiting part and a circuit board. The alloy supporting structure includes a bent part and a frame. The bent part includes a first surface, a second surface opposed to the first surface, at least one position-limiting opening and at least one positioning hole. The frame is connected with the bent part. The elastic metal sheet is fixed on the first surface of the bent part, and permitted to be swung relative to the bent part. The metal plate is fixed on the second surface of the bent part, and includes at least one positioning part. The at least one positioning part is protruded from the metal plate. The at least one metallic position-limiting part is penetrated through the at least one position-limiting opening. The elastic metal sheet and the metal plate are connected with each other through the at least one metallic position-limiting part. The circuit board is located over the elastic metal sheet. The at least one positioning part is penetrated through the at least one positioning hole, and connected with a casing of the electronic device.

In an embodiment, the elastic metal sheet further comprises a contacting part, and the contacting part is protruded from a lateral side of the elastic metal sheet. A bottom surface of the circuit board has a metallic solder pad corresponding to the contacting part. The contacting part is connected with the metallic solder pad.

In an embodiment, the contacting part has a plug-weld hole corresponding to the metallic solder pad, and the contacting part and the metallic solder pad are welded together through the plug-weld hole.

In an embodiment, the touchpad module further includes an adhesive layer between the elastic metal sheet and the circuit board, and the elastic metal sheet and the circuit board are combined together through the adhesive layer.

In an embodiment, the adhesive layer is made of a pressure sensitive adhesive.

In an embodiment, the frame includes a bulge, and a bottom surface of the circuit board includes a push button corresponding to the bulge. While the circuit board is swung relative to the alloy supporting structure through the elastic metal sheet, the push button is pushed by the bulge, and a triggering signal is generated.

In an embodiment, the touchpad module further includes a covering plate, and the covering plate is disposed on a top surface of the circuit board.

In an embodiment, the alloy supporting structure is made of aluminum alloy.

In an embodiment, the elastic metal sheet is made of tinplate or galvanized steel.

In an embodiment, the metal plate is made of tinplate or galvanized steel.

In an embodiment, the at least one metallic position-limiting part is made of tinplate or galvanized steel.

In an embodiment, the at least one metallic position-limiting part is formed on a surface of the metal plate.

In an embodiment, the at least one metallic position-limiting part is formed on a surface of the elastic metal sheet.

In an embodiment, each of the at least one positioning part has a first fastening hole.

In an embodiment, at least one fastening element is penetrated through the corresponding first fastening hole and tightened in the casing of the electronic device.

In an embodiment, the frame further includes at least one fixing part, and the at least one fixing part is protruded from a lateral side of the frame. Each of the at least one fixing part has a second fastening hole.

In an embodiment, at least one second fastening element is penetrated through the corresponding second fastening hole and tightened in the casing of the electronic device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
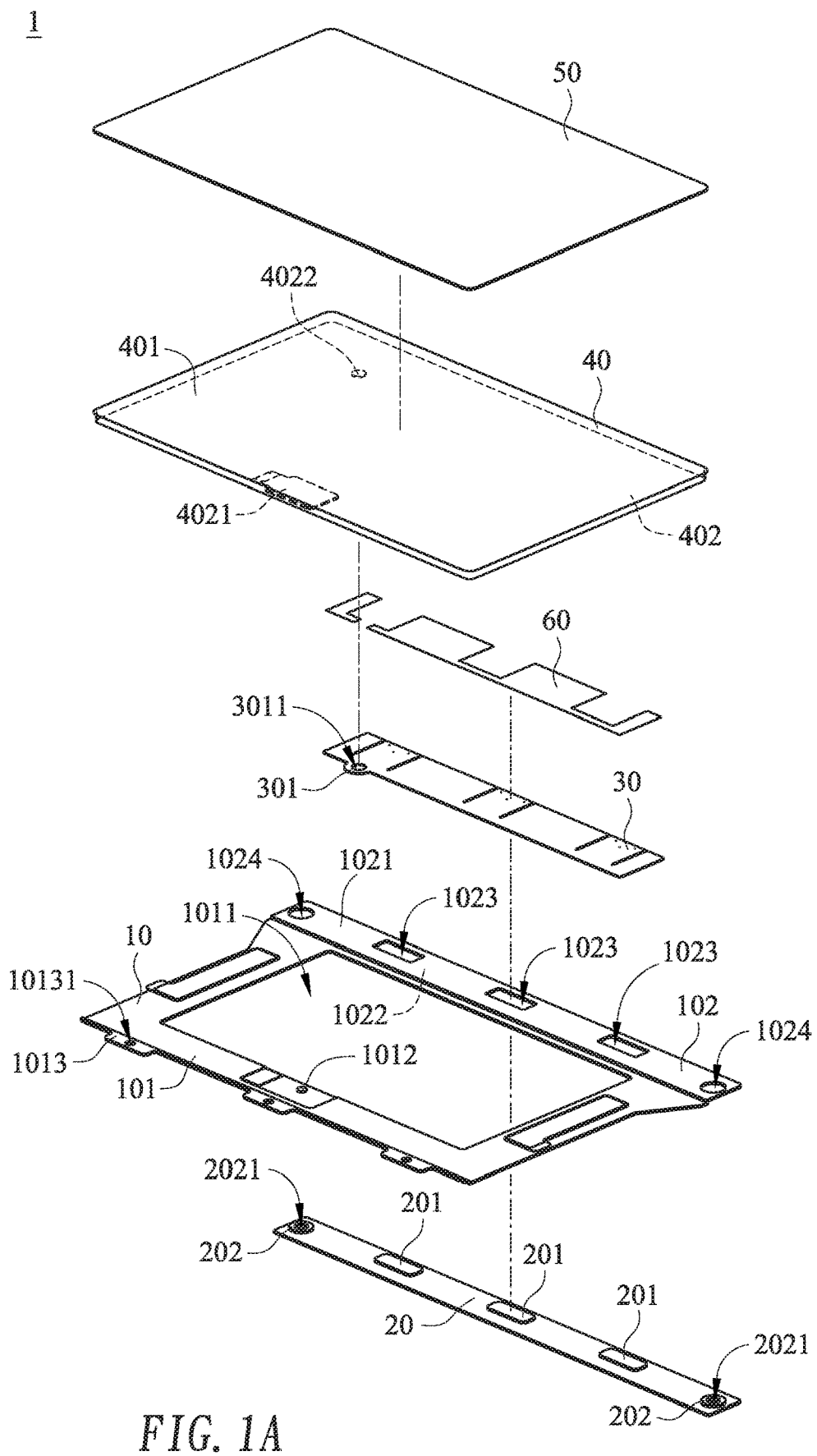
FIG. 1A is a schematic exploded illustrating a touchpad module according to an embodiment of the present invention.
Figure 1B:
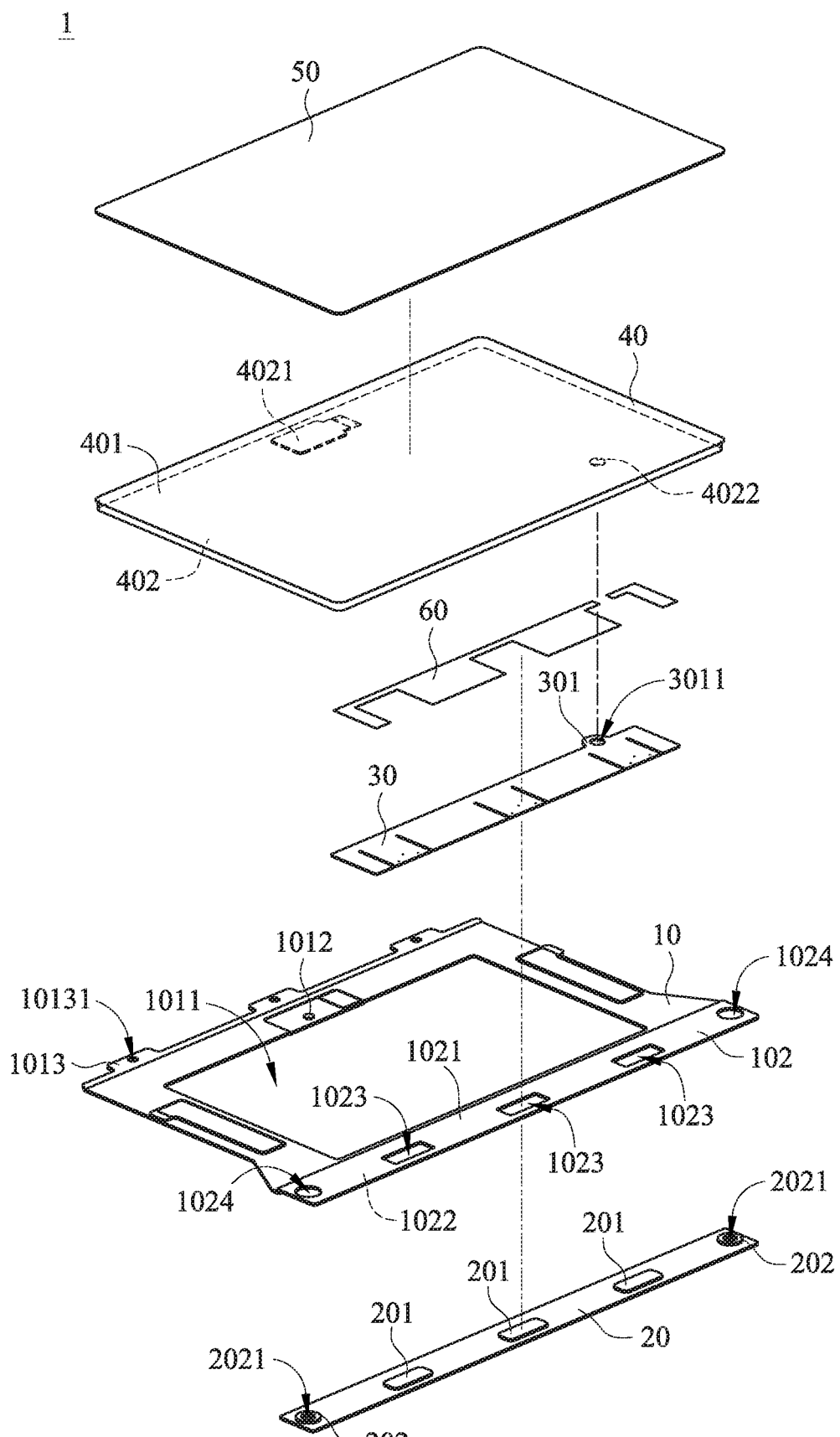
FIG. 1B is a schematic exploded illustrating the touchpad module as shown in FIG. 1A and taken along another viewpoint.

Please refer to FIGS. 1A and 1B. FIG. 1A is a schematic exploded illustrating a touchpad module according to an embodiment of the present invention. FIG. 1B is a schematic exploded illustrating the touchpad module as shown in FIG. 1A and taken along another viewpoint. The touchpad module 1 is applied to an electronic device. An example of the electronic device includes but is not limited to a notebook computer, a keyboard, a smart phone, a personal digital assistant (PDA), a writing tablet or a graphics tablet. In an embodiment, the touchpad module 1 comprises an alloy supporting structure 10, a metal plate 20, an elastic metal sheet 30, a circuit board 40, a covering plate 50 and an adhesive layer 60.

The alloy supporting structure 10 comprises a frame 101 and a bent part 102. The bent part 102 is connected with the frame 101. The frame 101 comprises a hollow portion 1011, a bulge 1012 and one or plural fixing parts 1013. The hollow portion 1011 runs through the frame 101. The bulge 1012 is arranged beside the hollow portion 1011 and disposed on a surface of the frame 101. The one or plural fixing parts 1013 are protruded from a lateral side of the frame 101. Each fixing part 1013 has a second fastening hole 10131. Moreover, one or plural fastening elements (not shown) are penetrated through the corresponding second fastening holes 10131. The bent part 102 comprises a first surface 1021, a second surface 1022, one or plural position-limiting openings 1023 and one or plural positioning holes 1024. The first surface 1021 and the second surface 1022 are opposed to each other. The position-limiting openings 1023 and the positioning holes 1024 run through the first surface 1021 and the second surface 1022. In this embodiment, the bent part 102 comprises two positioning holes 1024 and three position-limiting openings 1023. The two positioning holes 1024 are located at two opposite ends of the bent part 102, respectively. The three position-limiting openings 1023 are sequentially arranged between the two positioning holes 1024. The alloy supporting structure 10 is made of aluminum alloy, aluminum-magnesium alloy or any other appropriate low-conductivity/non-conductive lightweight material.

The metal plate 20 comprises one or plural metallic position-limiting parts 201 and one or plural positioning parts 202. The metallic position-limiting parts 201 are protruded from the surface of the metal plate 20 and aligned with the corresponding position-limiting openings 1023. The positioning parts 202 are aligned with the corresponding positioning holes 1024. Each positioning part 202 has a first fastening hole 2021. Moreover, one or plural fastening elements (not shown) are penetrated through the corresponding first fastening hole 2021. The metal plate 20 is fixed on the second surface 1022 of the bent part 102 by a laser spot welding. In addition, the metallic position-limiting parts 201 are penetrated through the corresponding position-limiting openings 1023, and the positioning parts 202 are penetrated through the corresponding positioning holes 1024. The metal plate 20 is made of tinplate, galvanized steel or highly-conductive material.

A first portion of the elastic metal sheet 30 is fixed on the first surface 1021 of the bent part 102 by a laser spot welding. A second portion of the elastic metal sheet 30 is not fixed on the first surface 1021 of the bent part 102. Moreover, the second portion of the elastic metal sheet 30 can be swung relative to the bent part 102. The elastic metal sheet 30 is connected with the metal plate 20 through the metallic position-limiting parts 201, which are disposed within the corresponding position-limiting openings 1023. Moreover, a contacting part 301 is protruded from a lateral side of the elastic metal sheet 30. The contacting part 301 has a plug-weld hole 3011. The elastic metal sheet 30 is made of tinplate, galvanized steel or highly-conductive material.

Moreover, the interlaying structure composed of the metal plate 20, the bent part 102 and the elastic metal sheet 30 can increase the overall mechanical strength of the alloy supporting structure 10.

The circuit board 40 is located over the elastic metal sheet 30. The circuit board 40 has a top surface 401 and a bottom surface 402. A push button 4021 and a metallic solder pad 4022 are disposed on the bottom surface 402 of the circuit board 40. The push button 4021 is aligned with the bulge 1012. The metallic solder pad 4022 is aligned with the plug-weld hole 3011 of the contacting part 301. In an embodiment, the adhesive layer 60 is arranged between the bottom surface 402 of the circuit board 40 and the elastic metal sheet 30. The circuit board 40 and the elastic metal sheet 30 are combined together through the adhesive layer 60. For example, the adhesive layer 60 is a pressure sensitive adhesive. The contacting part 301 and the metallic solder pad 4022 are welded together through the plug-weld hole 3011. In this embodiment, the contacting part 301 is equipped with the plug-weld hole 3011. Alternatively, in another embodiment, the contacting part 301 is not equipped with the plug-weld hole 3011. Under this circumstance, the contacting part 301 and the metallic solder pad 4022 are combined together by a spot welding process.

The covering plate 50 is adhered and fixed on the top surface 401 of the circuit board 40. The user's finger can press or slide on the covering plate 50. In this embodiment, the covering plate 50 is made of ceramic material or glass material. Alternatively, the covering plate 50 is made of sapphire crystal.

Figure 2:
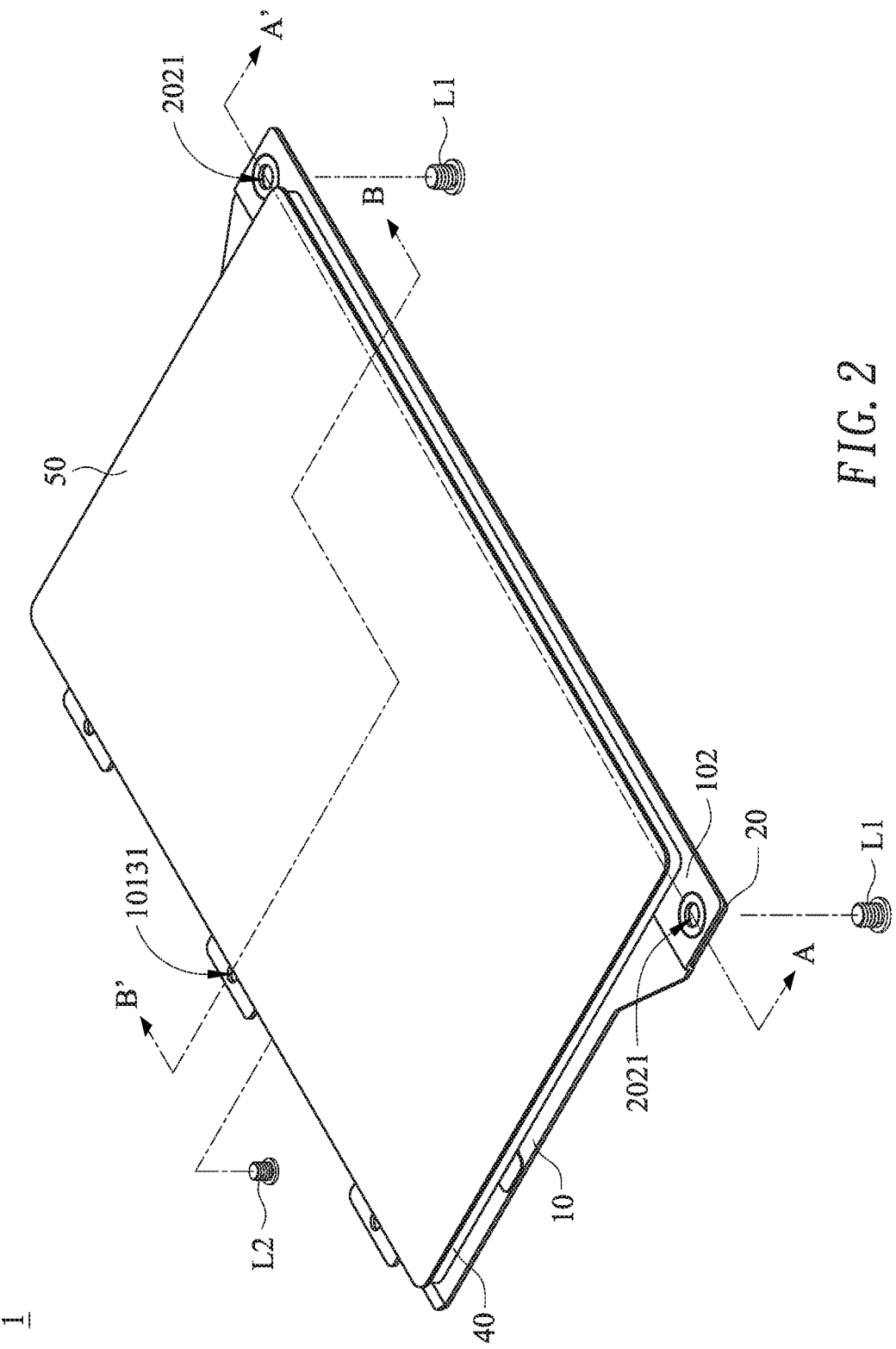
FIG. 2 is a schematic perspective view illustrating the touchpad module according to the embodiment of the present invention.
Figure 3A:
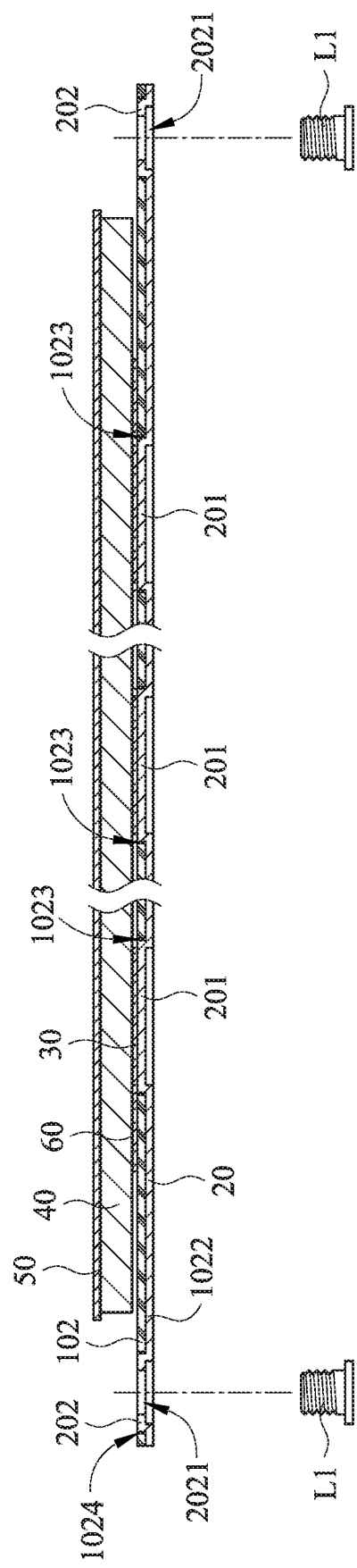
FIG. 3A is a schematic cross-sectional view illustrating the touchpad module as shown in FIG. 2 and taken along the line A-A'.
Figure 3B:
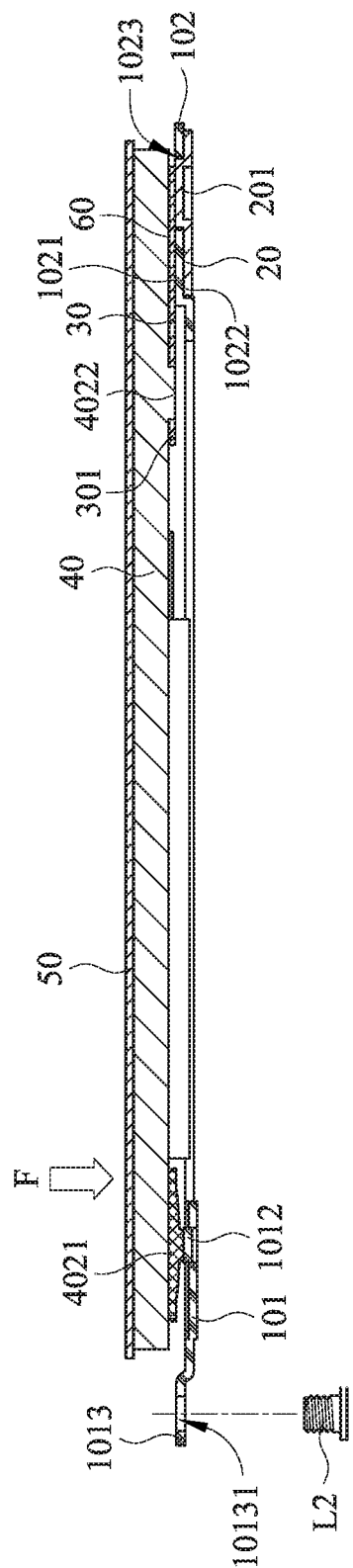
FIG. 3B is a schematic cross-sectional view illustrating the touchpad module as shown in FIG. 2 and taken along the line B-B'.

Please refer to FIGS. 2, 3A and 3B. FIG. 2 is a schematic perspective view illustrating the touchpad module according to the embodiment of the present invention. FIG. 3A is a schematic cross-sectional view illustrating the touchpad module as shown in FIG. 2 and taken along the line A-A'. FIG. 3B is a schematic cross-sectional view illustrating the touchpad module as shown in FIG. 2 and taken along the line B-B'.

As shown in FIG. 2, first fastening elements L1 and second fastening elements L2 are respectively penetrated through the first fastening hole 2021 and the second fastening hole 10131 of the touchpad module 1 and tightened into a casing of the electronic device (not shown). Consequently, the touchpad module 1 is fixed on the casing of the electronic device. The first fastening elements L1 or the positioning parts 202 (see FIG. 1A or FIG. 1B) that are connected with the casing of the electronic device can be used as ground terminals. In the above embodiment, the touchpad module 1 is fixed on the casing of the electronic device through the fastening elements. It is noted that numerous modifications and alterations may be made while retaining the teachings of the invention. For example, in another embodiment, a conductive adhesive is arranged between the positioning parts 202 and the casing of the electronic device. Under this circumstance, the touchpad module 1 is adhered and fixed on the casing of the electronic device through the positioning parts 202 and the conductive adhesive.

Please refer to FIG. 3A. In case that an electrostatic discharge effect of the circuit board 40 occurs, an electrostatic current is generated. The electrostatic current is transmitted to the elastic metal sheet 30 through the metallic solder pad 4022 and the contacting part 301, which is connected with the metallic solder pad 4022. Alternatively, the electrostatic current is directly transmitted to the elastic metal sheet 30 through the bottom surface 402 of the circuit board 40. Then, the electrostatic current is transmitted to the metal plate 20 through the metallic position-limiting parts 201, which are disposed within the corresponding position-limiting openings 1023. Then, the electrostatic current is transmitted to the casing of the electronic device through the positioning parts 202 of the metal plate 20 or the first fastening elements L1. Afterwards, the electrostatic current is guided to the ground through the casing of the electronic device. Consequently, the circuits or electronic components of circuit board 40 can be effectively protected from being attacked by the electrostatic current. In the above embodiment, the metallic position-limiting parts 201 are formed on the surface of the metal plate 20 to be connected with the second surface 1022 of the bent part 102. It is noted that numerous modifications and alterations may be made while retaining the teachings of the invention. For example, in another embodiment, the metallic position-limiting parts 201 are formed on the surface of the elastic metal sheet 30 to be connected with the first surface 1021 of the elastic metal sheet 30.

Please refer to FIG. 3B. As mentioned above, an interlaying structure is defined by the metal plate 20, the bent part 102 and the elastic metal sheet 30 collaboratively. During the rotation of the circuit board 40, the interlaying structure is served as a fulcrum. When a depressing force F is exerted on the covering plate 50, the circuit board 40 is swung relative to the alloy supporting structure 10 through the elastic metal sheet 30. Consequently, the push button 4021 is pushed by the bulge 1012, and a corresponding triggering signal is generated. Since the interlaying structure defined by the metal plate 20, the bent part 102 and the elastic metal sheet 30 provides good mechanical strength, the maximum number of times of pressing the touchpad module 1 and the durability of the touchpad module 1 are increased.

In comparison with the conventional technologies, the touchpad module of the present invention has lighter weightiness and higher mechanical structure. In addition, the touchpad module of the present invention has an electrostatic discharge protection function. In other words, the technology of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A touchpad module for an electronic device, the touchpad module comprising:
    an alloy supporting structure comprising a bent part and a frame, wherein the bent part comprises a first surface, a second surface opposed to the first surface, at least one position-limiting opening and at least one positioning hole, and the frame is connected with the bent part;
    an elastic metal sheet fixed on the first surface of the bent part, and permitted to be swung relative to the bent part;
    a metal plate fixed on the second surface of the bent part, and comprising at least one positioning part, wherein the at least one positioning part is protruded from the metal plate;
    at least one metallic position-limiting part penetrated through the at least one position-limiting opening, wherein the elastic metal sheet and the metal plate are connected with each other through the at least one metallic position-limiting part; and
    a circuit board located over the elastic metal sheet,
    wherein the at least one positioning part is penetrated through the at least one positioning hole, and connected with a casing of the electronic device.

2. The touchpad module according to claim 1, wherein the elastic metal sheet further comprises a contacting part, and the contacting part is protruded from a lateral side of the elastic metal sheet, wherein a bottom surface of the circuit board has a metallic solder pad corresponding to the contacting part, and the contacting part is connected with the metallic solder pad.

3. The touchpad module according to claim 2, wherein the contacting part has a plug-weld hole corresponding to the metallic solder pad, and the contacting part and the metallic solder pad are welded together through the plug-weld hole.

4. The touchpad module according to claim 1, wherein the touchpad module further comprises an adhesive layer between the elastic metal sheet and the circuit board, and the elastic metal sheet and the circuit board are combined together through the adhesive layer.

5. The touchpad module according to claim 4, wherein the adhesive layer is made of a pressure sensitive adhesive.

6. The touchpad module according to claim 1, wherein the frame comprises a bulge, and a bottom surface of the circuit board comprises a push button corresponding to the bulge, wherein while the circuit board is swung relative to the alloy supporting structure through the elastic metal sheet, the push button is pushed by the bulge, and a triggering signal is generated.

7. The touchpad module according to claim 1, wherein the touchpad module further comprises a covering plate, and the covering plate is disposed on a top surface of the circuit board.

8. The touchpad module according to claim 1, wherein the alloy supporting structure is made of aluminum alloy.

9. The touchpad module according to claim 1, wherein the elastic metal sheet is made of tinplate or galvanized steel.

10. The touchpad module according to claim 1, wherein the metal plate is made of tinplate or galvanized steel.

11. The touchpad module according to claim 1, wherein the at least one metallic position-limiting part is made of tinplate or galvanized steel.

12. The touchpad module according to claim 1, wherein the at least one metallic position-limiting part is formed on a surface of the metal plate.

13. The touchpad module according to claim 1, wherein the at least one metallic position-limiting part is formed on a surface of the elastic metal sheet.

14. The touchpad module according to claim 1, wherein each of the at least one positioning part has a first fastening hole.

15. The touchpad module according to claim 14, wherein at least one fastening element is penetrated through the corresponding first fastening hole and tightened in the casing of the electronic device.

16. The touchpad module according to claim 1, wherein the frame further comprises at least one fixing part, and the at least one fixing part is protruded from a lateral side of the frame, wherein each of the at least one fixing part has a second fastening hole.

17. The touchpad module according to claim 16, wherein at least one second fastening element is penetrated through the corresponding second fastening hole and tightened in the casing of the electronic device.

* * * * *